United States Patent
Swallow et al.

(10) Patent No.: US 7,365,031 B2
(45) Date of Patent: Apr. 29, 2008

(54) CONDUCTIVE PRESSURE SENSITIVE TEXTILE

(75) Inventors: Stanley Shigezo Swallow, Middlesex (GB); Asha Peta-Thomson, Middlesex (GB)

(73) Assignee: Intelligent Textiles Limited (GB)

( * ) Notice: Subject to any disclaimer, the term of this patent is extended or adjusted under 35 U.S.C. 154(b) by 71 days.

(21) Appl. No.: 10/240,567

(22) PCT Filed: Apr. 2, 2001

(86) PCT No.: PCT/GB01/01518

§ 371 (c)(1),
(2), (4) Date: Oct. 2, 2002

(87) PCT Pub. No.: WO01/75778

PCT Pub. Date: Oct. 11, 2001

(65) Prior Publication Data

US 2003/0119391 A1    Jun. 26, 2003

(30) Foreign Application Priority Data

Apr. 3, 2000 (GB) .................. 0008164.6
Jul. 24, 2000 (GB) .................. 0001813.5

(51) Int. Cl.
*D03D 15/00* (2006.01)

(52) U.S. Cl. .................. 442/181; 442/37; 442/192; 442/193; 442/195; 442/196; 442/197; 442/203; 442/217; 442/228; 442/229; 442/301; 442/364; 442/365; 442/372; 442/376; 442/400; 442/402; 2/902; 345/173; 345/174; 178/18.05; 174/68.1; 174/124 R; 428/364; 428/365; 428/377; 73/862.046

(58) Field of Classification Search .............. 442/228, 442/229, 192, 193, 195, 196, 301, 181, 203, 442/217, 197; 428/400, 402, 372, 376, 364, 428/365, 377; 174/68.1, 124 R; 73/862.046; 2/902; 345/173, 174; 178/18.05
See application file for complete search history.

(56) References Cited

U.S. PATENT DOCUMENTS 3,378,629 A * 4/1968 Rask ..................... 174/117 M (Continued)

FOREIGN PATENT DOCUMENTS

DE     42 36 187 A1     5/1993

(Continued)

OTHER PUBLICATIONS

Lind et al. (1997). A Sensate liner for personnel monitoring applications. Proc. 1st IEEE Int. Symp. on Wearable Computers (ISWC'97). Oct. 1997. Cambridge, Mass., USA: IEEE Press.

(Continued)

*Primary Examiner*—Andrew T Piziali
*Assistant Examiner*—Peter Y Choi
(74) *Attorney, Agent, or Firm*—Craig A. Fieschko, Esq.; DeWitt Ross & Stevens S.C.

(57) ABSTRACT

A fabric including within its construction a first elongated electrical conductor crossed by a second elongated electrical conductor, the conductors being normally biased apart at a crossover point of said fibres with an air gap between them, whereby application of pressure in a direction substantially normal to a plane of the fabric causes the conductors to make contact. The fabric may be woven, knitted, non-woven or plaited. The fabric can be used as a pressure sensor, switch or other sensor.

25 Claims, 12 Drawing Sheets

Woven piece of fabric, showing conductive and insulative yarns, with weft floats at crossover points between conductors

U.S. PATENT DOCUMENTS

| | | | |
|---|---|---|---|
| 3,414,666 A * | 12/1968 | Doundoulakis et al. | 174/261 |
| 3,513,297 A | 5/1970 | Jordan | |
| 3,711,627 A * | 1/1973 | Maringulov | 174/255 |
| 3,798,370 A | 3/1974 | Hurst | |
| 3,911,215 A | 10/1975 | Hurst et al. | |
| 4,080,519 A | 3/1978 | Michalson | |
| 4,085,302 A | 4/1978 | Zenk et al. | |
| 4,220,815 A | 9/1980 | Gibson et al. | |
| 4,484,038 A | 11/1984 | Dorman et al. | |
| 4,538,054 A | 8/1985 | De La Bretoniere | |
| 4,659,873 A | 4/1987 | Gibson et al. | |
| 4,687,885 A | 8/1987 | Talmage, Jr. et al. | |
| 4,707,845 A | 11/1987 | Krein et al. | |
| 4,715,235 A * | 12/1987 | Fukui et al. | 73/862.68 |
| 4,776,160 A | 10/1988 | Rees | |
| 4,795,998 A * | 1/1989 | Dunbar et al. | 338/5 |
| 4,798,919 A | 1/1989 | Miessler et al. | |
| 4,822,957 A | 4/1989 | Talmage, Jr. et al. | |
| 4,933,660 A | 6/1990 | Wynne, Jr. | |
| 5,047,602 A | 9/1991 | Lipka | |
| 5,060,527 A | 10/1991 | Burgess | |
| 5,159,159 A | 10/1992 | Asher | |
| 5,220,136 A | 6/1993 | Kent | |
| 5,262,778 A | 11/1993 | Saunders | |
| 5,453,941 A | 9/1995 | Yoshikawa | |
| 5,686,705 A | 11/1997 | Conroy et al. | |
| 5,815,139 A | 9/1998 | Yoshikawa et al. | |
| 5,852,260 A | 12/1998 | Yoshikawa | |
| 5,878,620 A | 3/1999 | Gilbert et al. | |
| 5,881,547 A * | 3/1999 | Chiou et al. | 57/216 |
| 6,032,450 A | 3/2000 | Blum | |
| 6,210,771 B1 | 4/2001 | Post et al. | |
| 6,216,545 B1 * | 4/2001 | Taylor | 73/862.046 |
| 6,216,546 B1 | 4/2001 | Bahr | |
| 6,319,015 B1 | 11/2001 | Faunce | |
| 6,333,736 B1 * | 12/2001 | Sandbach | 345/178 |
| 6,488,564 B1 * | 12/2002 | Gray | 450/57 |
| 6,852,395 B2 * | 2/2005 | Dhawan et al. | 428/196 |
| 2003/0211797 A1 | 11/2003 | Hill et al. | |

FOREIGN PATENT DOCUMENTS

| | | |
|---|---|---|
| EP | 0 161 895 A2 | 12/1985 |
| EP | 0 172 783 A2 | 2/1986 |
| EP | 0 210 063 A2 | 6/1986 |
| EP | 0 194 861 A2 | 9/1986 |
| EP | 0 206 450 A2 | 12/1986 |
| EP | 0 222 239 B1 | 5/1987 |
| EP | 0 392 736 A2 | 4/1990 |
| EP | 0 454 269 A2 | 4/1991 |
| EP | 0 855 307 A2 | 7/1998 |
| EP | 0 911 435 A2 | 4/1999 |
| EP | 0 989 509 A2 | 3/2000 |
| EP | 1 339 259 A1 | 8/2003 |
| GB | 1 331 942 | 9/1973 |
| GB | 1 516 004 | 6/1978 |
| GB | 2 095 036 A | 9/1982 |
| GB | 2 115 555 A | 9/1983 |
| GB | 2 134 719 A | 8/1984 |
| GB | 2 222 485 A | 3/1990 |
| GB | 2 339 495 A | 5/1998 |
| GB | 2 341 929 A | 9/1998 |
| GB | 2 339 495 A | 1/2000 |
| GB | 2 341 933 A | 3/2000 |
| GB | 2 341 978 A | 3/2000 |
| GB | 2 343 516 A | 5/2000 |
| JP | 58017331 | 2/1983 |
| RU | 2 046 552 C1 | 10/1995 |
| RU | 2 145 984 C1 | 2/2000 |
| RU | 2 155 461 C1 | 8/2000 |
| RU | 2 187 907 C1 | 8/2002 |
| WO | WO 86 05678 A1 | 3/1986 |
| WO | WO 90/10204 A1 | 9/1990 |
| WO | GB99/01601 | 5/1998 |
| WO | GB99/03600 | 5/1999 |
| WO | WO 9960357 A1 * | 11/1999 |
| WO | WO 01/75778 A1 | 10/2001 |

OTHER PUBLICATIONS

Orth et al., (1998). Fabric computing interfaces. Proc. ACM CHI '98. Apr. 1998, Los Angeles, CA., USA: ACM Press.

Post et al., (1997). Smart fabric, or washable computing, Proc. 1st IEEE Int. Symp. on Wearable Computers (ISWC'97). Oct. 1997, Cambridge, Mass., USA: IEEE Press.

* cited by examiner

Figure 1. Grid arrangement of elongated conductors

Figure 2. Effects of applied pressure on a crossover between two conductors, cross sectional views and plotted relationship

Figure 3. Woven piece of fabric, showing conductive and insulative yarns, with weft floats at crossover points between conductors a) Conductive weft floated over conductive warp results in minimal contact area b) As (a) but smaller diameter conductive warp results in physical separation Pressure applied to structure (b) effects contact between the conductors Figure 4. Weaving conductive yarns with weft floats at crossovers to control contact area, cross sectional views a) Conductive cored yarn with partially encircling insulation, perspective view b) Insulative yarns hold conductive yarns apart c) Applied pressure deflects insulative yarns, allowing conductive yarns to make contact Figure 5. Conductive cored yarn with partially encircling insulative yarns as a separation technique a) Conductive encircling yarn partially embedded into insulative core yarn, perspective view b) Insulative core stands proud of conductive yarns, holding them apart c) Applied pressure compresses the insulative yarn surface, allowing conductive yarns to make contact Figure 6. Insulative cored yarn with embedded conductive yarns as a separation technique Figure 7. Conductive cored yarn encircled with displaceable insulator as a separation technique

Figure 8. Translation of the described techniques from a weaving to a braiding process. The resulting composite yarn can detect an applied pressure at some point along its length a) Basic configuration b) Greater number of conductive warp yarns at a crossover c) Greater number of floated insulative warp yarns at a crossover Figure 9. Variations of floated weave structure, cross sectional views Figure 10. Woven bus-bars: arrangement and weave structure a) Warp design over 24 shafts using conductive multifilament, cotton and conductive monofilament.

b) Lifting sequence/ Peg plan using cotton and conductive monofilament

Figure 11. Technical specifications for weave structure

Examples of matrix interrogations

| Switch | D1 | D2 | D3 | Q1 | Q2 | Q3 |
|--------|----|----|----|----|----|----|
| PointA | 1 | 0 | 0 | 0 | 0 | 1 |
|        | 0 | 1 | 0 | 0 | 0 | 1 |
|        | 0 | 0 | 1 | 0 | 0 | 0 |
| PointB | 1 | 0 | 0 | 1 | 0 | 1 |
|        | 0 | 1 | 0 | 0 | 0 | 0 |
|        | 0 | 0 | 1 | 0 | 0 | 0 |
| PointC | 1 | 0 | 0 | 0 | 0 | 0 |
|        | 0 | 1 | 0 | 1 | 0 | 0 |
|        | 0 | 0 | 1 | 0 | 1 | 1 |

N.B. only conductive yarns shown for clarity

Key to crossover types

- ● pressure actuated switch
- ○ permanently unconnected
- ✗ permanently connected Figure 12. Individually addressable multiplexed switches within a woven fabric construction

CONDUCTIVE PRESSURE SENSITIVE TEXTILE

FIELD OF THE INVENTION

The present invention relates to methods of constructing one or more pressure activated electrical switches or sensors in fabric, in the preferred embodiment as integral elements of a single fabric sheet.

BACKGROUND OF THE INVENTION

Electrically conductive fabric sheets are known in the art and are described, for example in the applicant's earlier British patent application 2,339,495. The known conductive fabric sheets typically comprise two conductive layers separated by an insulating layer which can be bridged upon application of pressure on the conductive layers. Although such fabric assemblies can function well, there are inevitable drawbacks with having to have three or more fabric layers, including additional cost, fabric thickness, need to maintain alignment between the various layers, movement of the layers during use and so on.

SUMMARY OF THE INVENTION

The present invention seeks to provide an improved conductive textile. According to an aspect of the present invention, there is provided a fabric as specified in claim 1.

The preferred embodiment provides a woven, knitted, non-woven or plaited fabric including in its woven, knitted, non-woven or plaited construction a first elongated electrical conductor crossed by a second elongated electrical conductor, the conductors being normally biased apart at the crossover point with an air gap between them whereby the application of pressure normal to the plane of the fabric causes the conductors to make contact.

Preferably, the fabric includes a plurality of spaced first conductors and/or a plurality of spaced second conductors thereby forming a plurality of said crossover points. The conductors may comprise electrically conductive filaments or fibres.

Advantageously, the fabric is a woven fabric; the warp of which may include at least one said first electrical conductor and the weft may include at least one said second electrical conductor.

A number of means may be employed, separately or in combination, to bias the conductors apart at the crossover points; in one preferred embodiment this being achieved by including insulating fibres or filaments in the fabric. For example, the biasing apart may be effected by employing, as at least one of the electrical conductors, an electrical conductor having insulating filament or fibre wound round it to leave the surface of the conductor exposed at the crossover point. In another example, the biasing apart is effected by twisting at least one of the electrical conductors together with insulating filament or fibre. Alternatively, the biasing apart may be effected by employing, as at least one of the electrical conductors, an electrical conductor which is supported on and between deformable protuberances of an insulating filament or fibre. In another embodiment, the biasing apart may be effected by including in the weave warp and/or weft floats over more than one yarn.

It is preferred that the electrical conductors have an electrical property which is proportional to or reproducible from the length of the conductor. The length of a conductor or plurality of connecting conductors may then be determined from measurement of that property. Advantageously, the electrical property is resistance.

For some applications, it will be advantageous for the fabric to have at least one set of spaced electrical conductors, at least some of said set being electrically connected together to form at least one bus bar. Where said set of spaced electrical conductors comprise electrically conductive filaments or fibres in the warp or weft of a woven construction, electrical connection between conductors of that set may be provided by one or more electrically conducting filaments or fibres in the weft or warp, respectively. Alternatively, said electrical connection may be effected after the weaving process.

In a preferred embodiment, there is provided a fabric including a plurality of weft fibres and a plurality or warp fibres, first and second conductive fibres within the weft and warp fibres and at least one insulating fibre within the weft and/or warp fibres, the insulating fibre acting to bias apart said first and second conductive fibres so as to provide space therebetween.

The fabric may include a plurality of insulating fibres within one of the weft and warp fibres, which insulating fibres provide a bridge for a conductive fibre in the other of the weft and warp fibres, such that said conductive fibre floats over one or more conductive fibres in the one of the weft and warp fibres.

In another embodiment, one or more insulating fibres is provided around at least one of the conductive fibres, for example helically disposed therearound. Alternatively, one or more conductive fibres could be provided around at least one insulating fibre, with the insulating fibre including portions, for example projections, extending beyond the perimeter of the conductive fibre or fibres. The insulating fibre can thus provide the spacing means for spacing the conductor from other conductors within the fabric layer.

It will be apparent that the invention can provide a conductive textile for a pressure sensor or switch or other conductive device within a single layer of fabric. This can obviate the problems discussed above.

In addition, it is possible to reduce the edge effect (non-linearity of resistance relative to position) which is intrinsic to three-layer structures and which must be corrected for to provide accurate measurements. Moreover, it is possible to have significantly higher resolution, possibly ten times or more, relative to the three layer device; the resolution being dependent upon weaving techniques and fibre dimensions.

With the preferred embodiments, it is possible to provide for contact of the conductive fibres upon the application of a specific pressure or pressures to the fabric and this can be determined by the size of the air gap, the tension of the weave, the deformability of the conductors and the compressibility of the insulators. Moreover, it is possible to provide a range of pressure sensitivities within a single fabric structure. For example, with the embodiment of floating conductor (described with reference to FIG. 3 below) different pressure sensitivities can be provided with a plurality of bridges having a different number of conductors below the bridges and/or different insulating fibres, such as different thicknesses or compressibilities. Similar effects can be envisaged with respect to the other embodiments of fibre disclosed herein.

As an alternative, there can be provided two or more layers of the described fabric, having the same or different structures.

According to another aspect of the present invention, there is provided a fibre including a conductive yarn around which is wrapped at least one insulating yarn. Preferably, there are provided two or more insulating yarns helically wound around the conductive yarn.

According to another aspect of the present invention, there is provided a fibre including an insulating yarn around which is wrapped at least one conductive yarn, the insulating yarn including portions extending beyond the conductive yarn or yarns. Preferably, there are provided two or more conductive yarns helically wound around the insulating yarn. The projecting portions could be strands of fibre, protrusions and the like.

It is possible with the present invention to provide an electrically conductive textile having the features described in British patent application 2,339,495 with only a single layer of fabric.

The preferred embodiments of fabric can be significantly cheaper to produce than the structure described in British patent application 2,339,495.

BRIEF DESCRIPTION OF THE DRAWINGS

Various embodiments of the present invention are described below, by way of example only, with reference to the accompanying drawings, in which.

DETAILED DESCRIPTION OF PREFERRED EMBODIMENTS OF THE INVENTION

Figure 1:
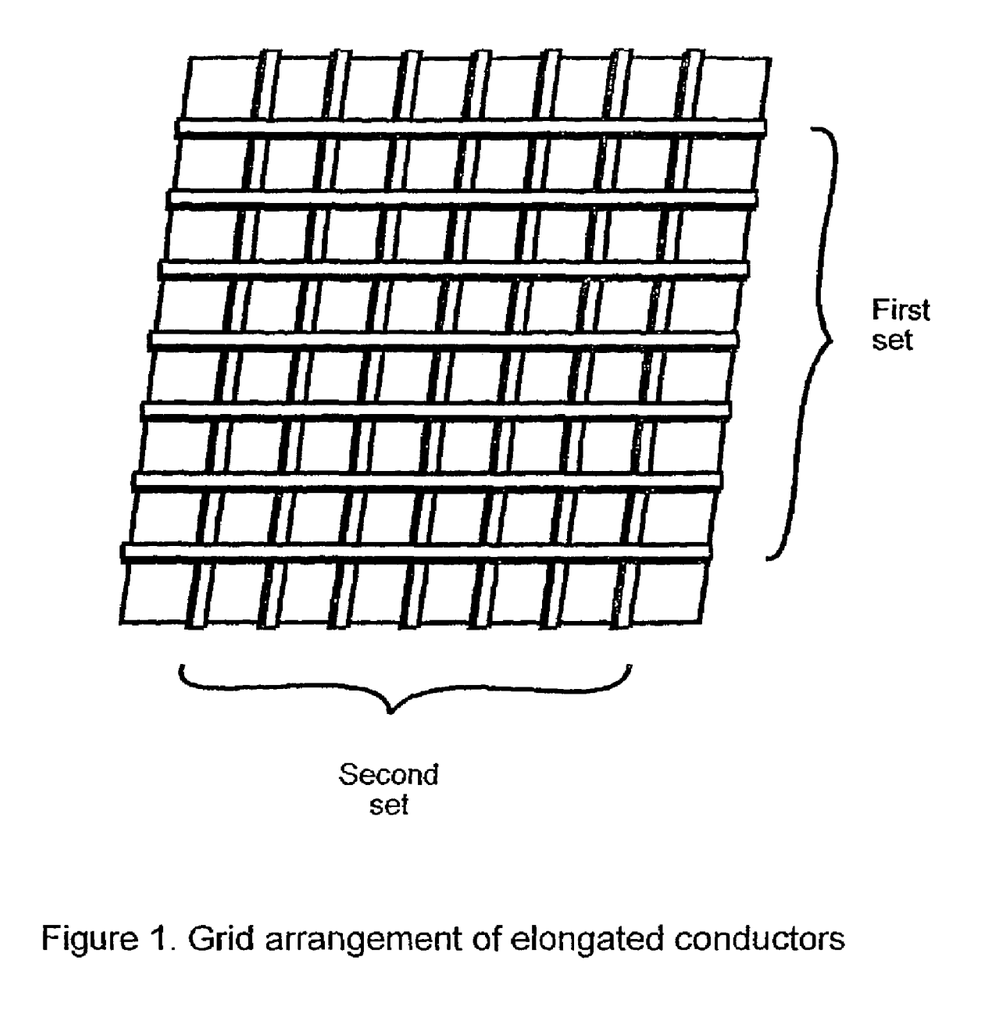
FIG. 1 is a perspective view of a grid arrangement of elongate conductors.
Figure 2:
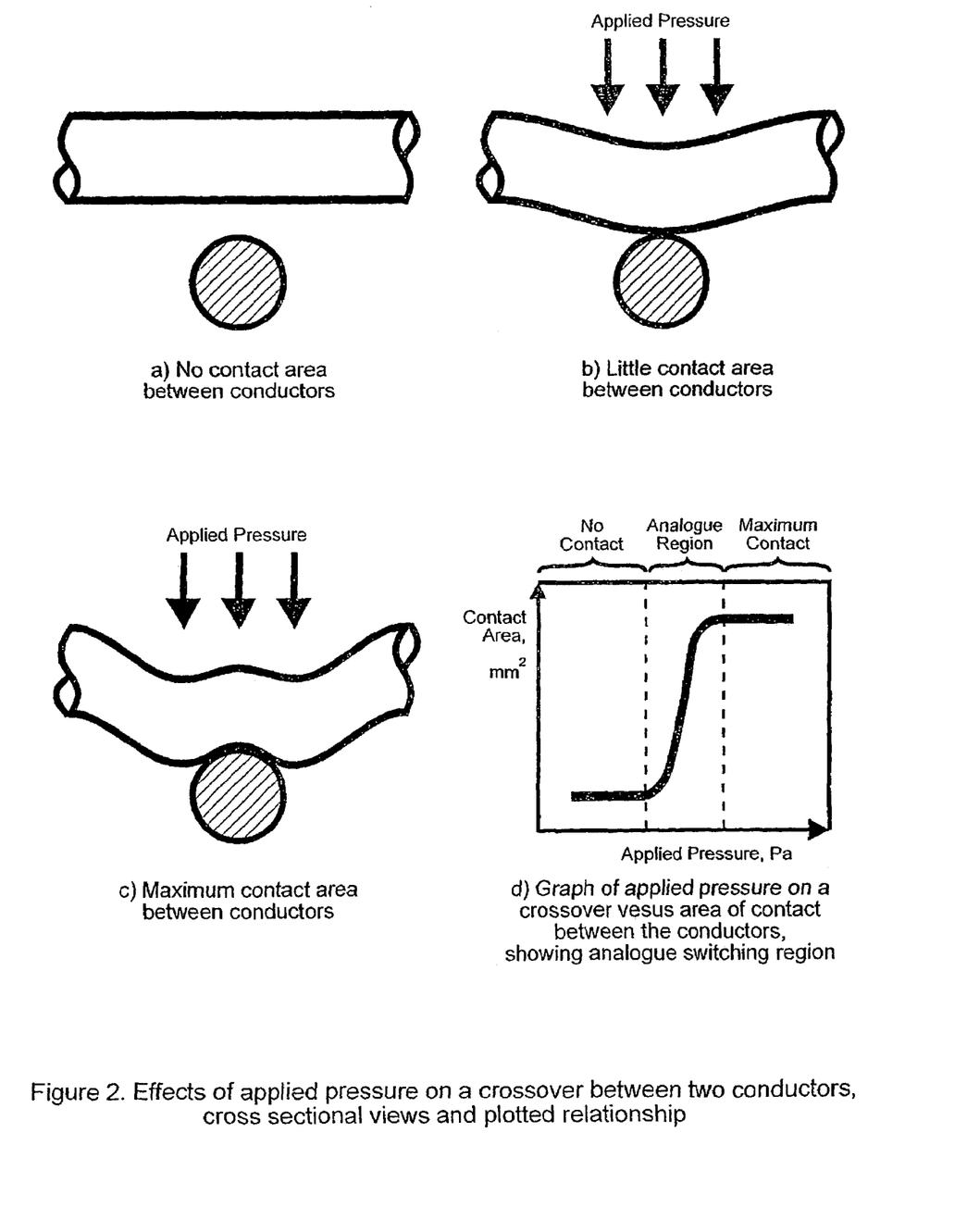
FIG. 2 depicts the effects of applied pressure on a crossover between two conductors.

Referring to the Figures, in the embodiment of FIG. 1, the piece of fabric preferably comprises at least two sets of elongate electrical conductors. Typically, the conductors in each set are arranged in parallel relative to one another and one set of conductors is arranged perpendicular relative to the other set to form an arbitrarily spaced grid, as shown in FIG. 1. The elongated electrical conductors are typically mono-filament or multi-filament conductive fibres, while the remainder of the piece of fabric is composed of insulating fibres.

Where any two conductors cross over one another, the construction of the fabric and/or the conductive fibres maintains their physical separation, as shown in the cross-sectional view of two conductors in FIG. 2(*a*). When pressure is applied normal to the plane of the fabric, the conductive fibres are caused to deflect and make electrical contact, as in FIG. 2(*b*). Thus, each crossover point constitutes a momentary contact electrical switch, which will maintain contact while the applied pressure exceeds a threshold. The threshold pressure can be predetermined and controlled at manufacture.

The switches also exhibit an analogue switching region, as the area of contact shared by the two conductors varies according to the applied pressure, until a maximum contact area is achieved, as shown in FIG. 2(*c*). The manufacturing variables of the piece of fabric can be controlled such that, in use, the switches operate predominantly within this analogue region, demarcated by the dashed lines in FIG. 2(*d*). If this area of contact is measured through some electrical property, for instance resistance, the crossovers can constitute pressure sensors.

Figure 3:
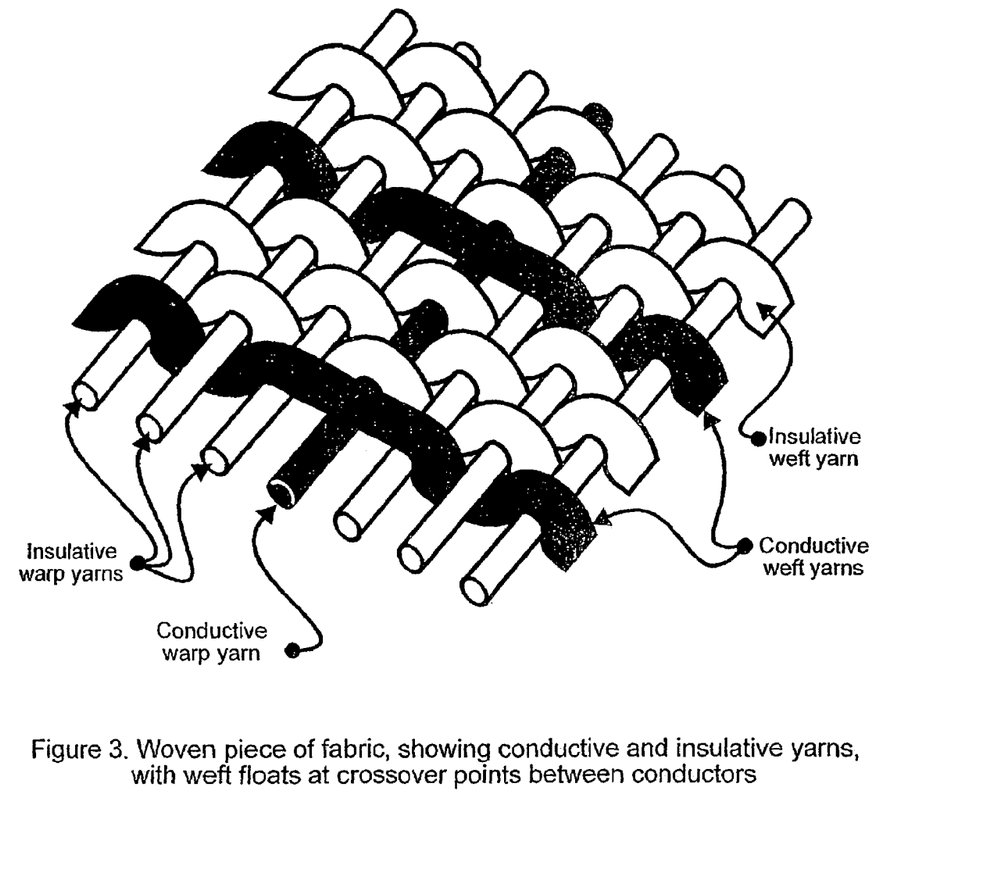
FIG. 3 is a perspective view of an embodiment of fabric with floating conductors.

Although the piece of fabric can be of knitted or felted construction, it is envisaged that the primary application of this technology will be to woven fabric structures. In this latter case, the two sets of conductive fibres can constitute warp and weft yarns, respectively, with insulating yarns composing the remainder of the piece of fabric and acting to space apart the individual conductive yarns of each set. A typical example of a woven piece of fabric, incorporating two crossover points, is shown in FIG. 3.

Separation Techniques

A number of techniques can be used for maintaining a degree of physical separation between two conductive fibres at a crossover point. These techniques include the use of weave structures with floated yarns and composite conductive/insulating yarns. The different techniques may be used together, allowing, for example, a piece of fabric that incorporates both conductive cored composite yarn and a weave structure with floats.

Separation Technique—Weaving with Floats over One or More Yarns

The first described separation technique is the use of a weave structure with floats, a term applied to a portion of weft yarn that passes over or under more than one warp yarn or vice-versa. To achieve separation of the two conductive yarns at a crossover, typically, the weft conductive yarn is floated over the warp conductive yarn and one or more insulating warp yarns to either side, as is shown in FIG. 3. As a result, the two conductive yarns share little or no physical contact area, as shown in the cross-sectional view, longitudinal to the weft, of FIG. 4(*a*).

Figure 4:
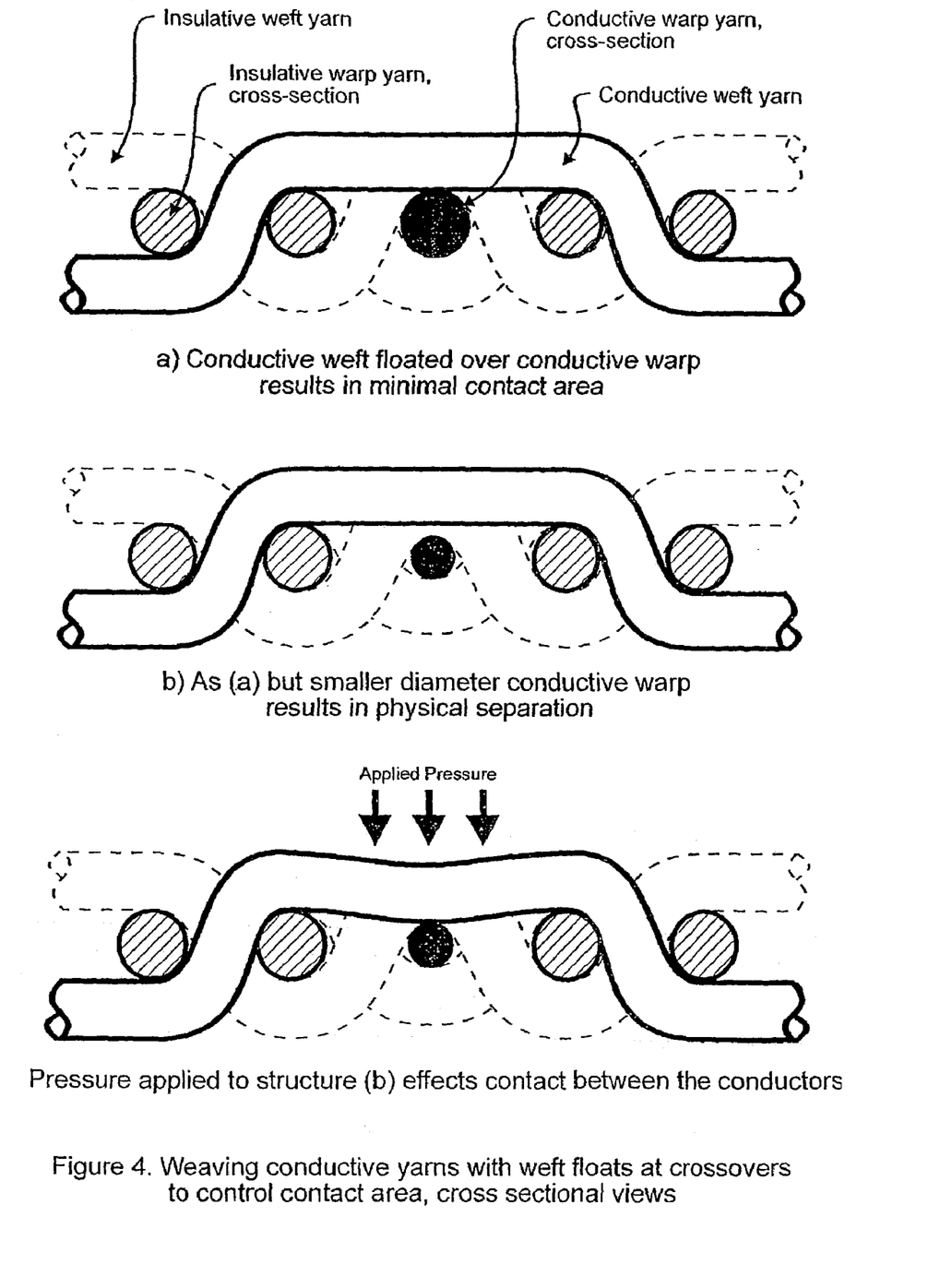
FIG. 4 shows the operation of the fabric of FIG. 3.

If the conductive warp yarn is of smaller diameter than the surrounding insulating warp yarns, their physical separation can be effected, as shown in FIG. 4(*b*). When pressure is applied normal to the plane of the fabric, the yarns and surrounding fabric deflect, and the two conductors make electrical contact, as in FIG. 4(*c*). Increasing applied pressure increases the area of contact, as in FIG. 2(*c*). The yarns must exhibit sufficient elasticity to recover from the deflection upon removal of the applied pressure, and thus return to their separated positions, breaking the electrical contact.

Separation Technique—Conductive Cored Yarn Encircled with Displaceable Insulator Another separation technique involves using a specific composite construction for the conductive yarns. In this composite yarn, a conductive mono-filament or multi-filament core yarn is twisted, braided, spun, plaited, co-moulded, coated, sleeved or otherwise partially encircled by insulating material, as shown in FIG. 5(*a*).

Figure 5:
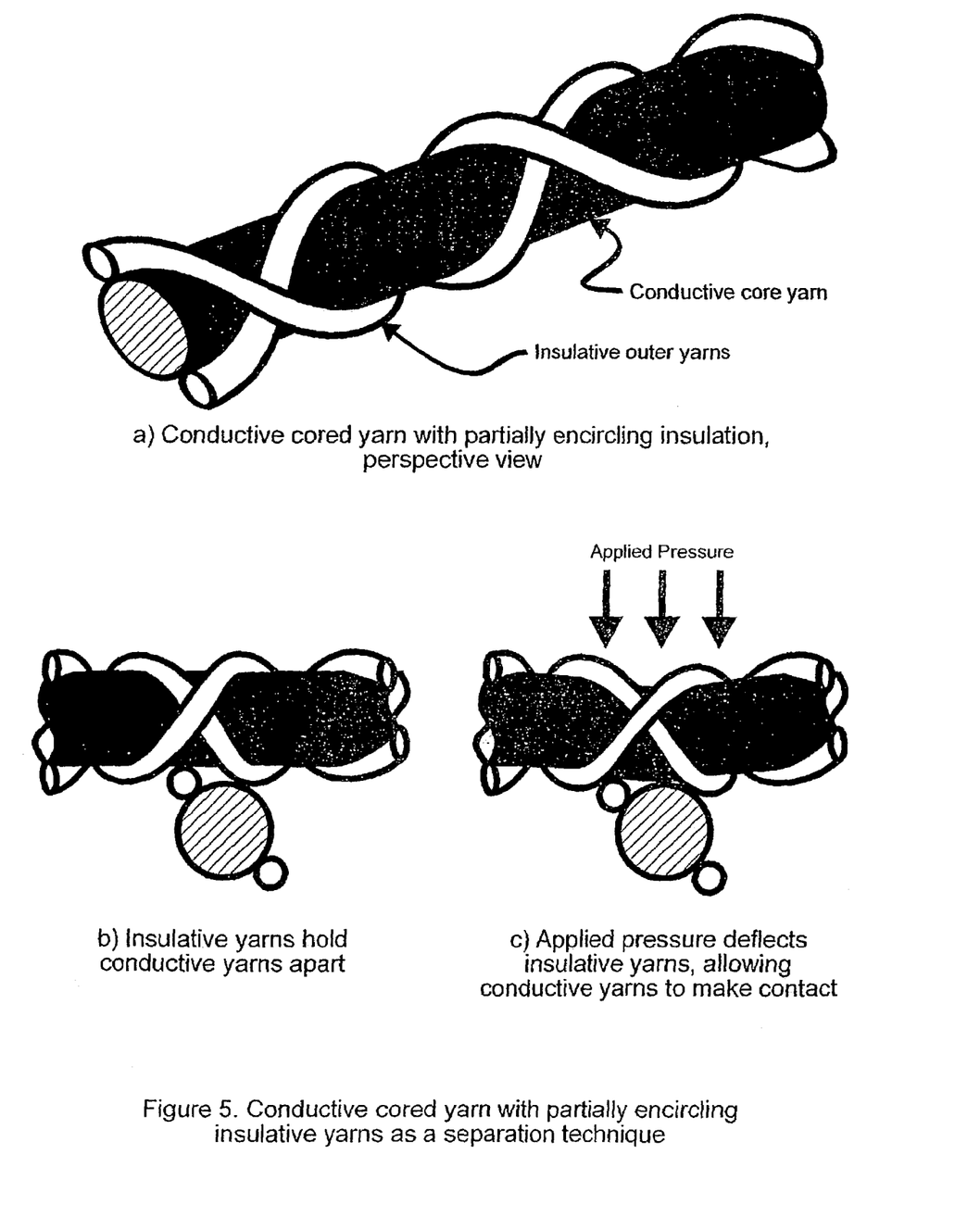
FIG. 5 shows various views of an embodiment of yarn.

When a crossover point between two conductive yarns, at least one of which is of this nature, is not subject to pressure, the insulating material is interposed between the conductors, as in FIG. 5(*b*), ensuring physical separation. However, when subjected to pressure normal to the plane of the fabric, the encircling insulating material can twist, compress, move aside or otherwise deflect to allow electrical contact between the core conductor yarns, as FIG. 5(c) shows. Upon removal of the applied pressure, the insulating material springs back into position and/or shape between the conductors to break (open) the electrical contact.

The geometry of the composite yarn and the compressibility, stiffness and surface textures of its constituent yarns contribute to determining the pressure threshold of a crossover point and can readily be determined by experiment. Composite yarns of this type may be used to construct plain weave crossover points, without the float structures described above.

Separation Technique—Compressible, Insulating Cored Yarn Encircled with Conductor Another separation technique involves another type of composite construction for the conductive yarns. In this composite yarn, which is a reverse case of the yarn detailed above, an insulating mono-filament or multi-filament core yarn is twisted, spun, braided, plaited, co-extruded, coated, sleeved or otherwise partially encircled by conductive yarns or material.

Figure 6:
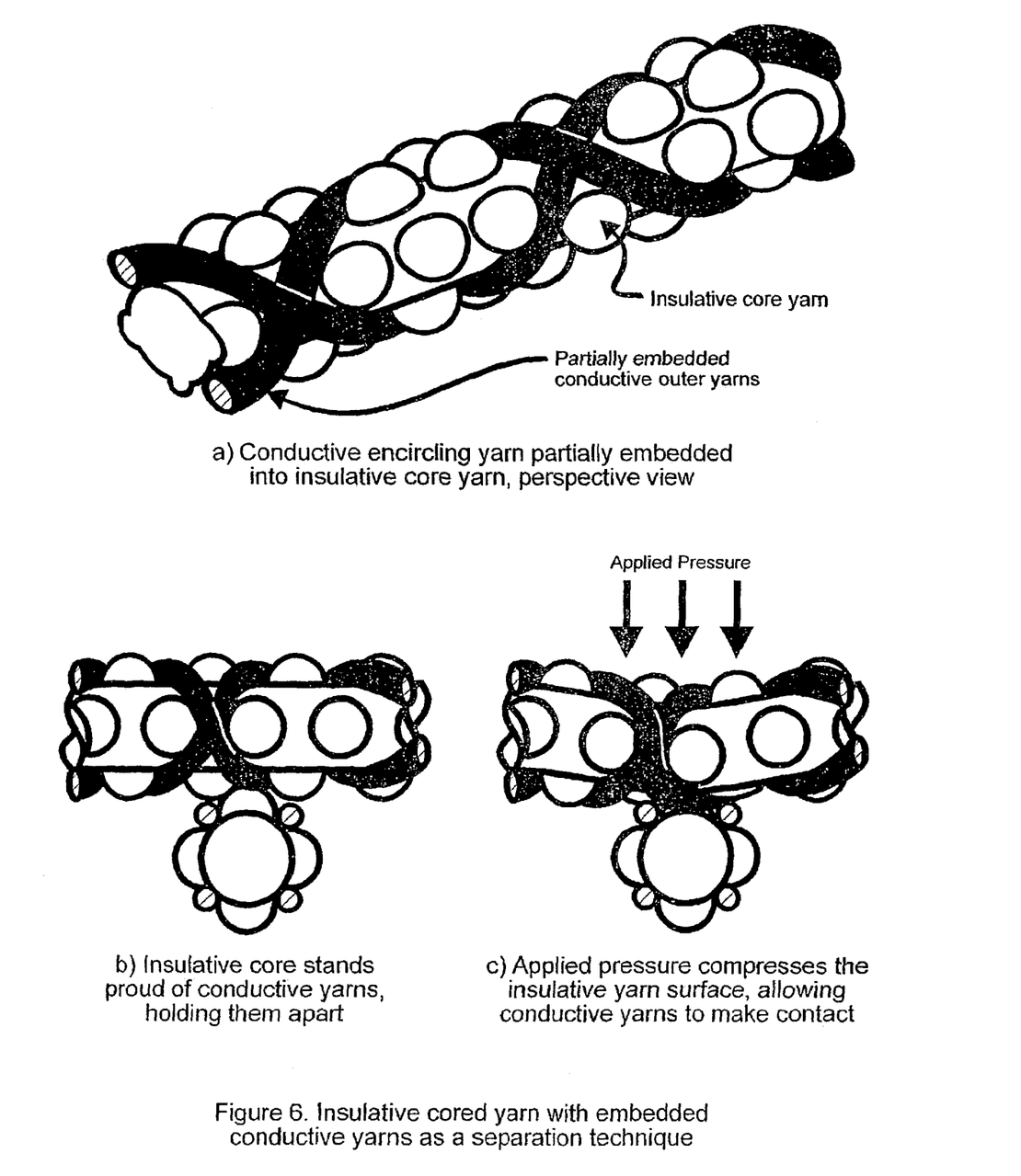
FIG. 6 shows various views of another embodiment of yarn.

Additionally or alternatively, a conductive core may be co-extruded with an insulating coating and then subjected to post production processing to selectively expose areas of the conductive core. The conductive yarns are partially embedded into the insulating core yarn, such that the compressible, yielding surface of the core yarn stands proud of the conductive yarns, as shown in FIG. 6(a). Alternatively, but to the same end, thin conductive yarns may be twisted or spun with larger insulating yarns such that the insulating yarns stand proud of the conductive yarns.

When a crossover point between two conductive yarns, at least one of which is of this nature, is not subject to pressure, the insulating material that stands proud of the conductive yarns ensures physical separation of the conductors, as FIG. 6(b). However, when subject to pressure normal to the plane of the fabric, the insulating material can compress to allow electrical contact between the embedded conductor yarns, as shown in FIG. 6(c). Upon removal of the applied pressure, the insulating material springs back into position to hold the conductors apart and break the electrical contact.

The geometry of the composite yarn and the compressibility, stiffness and surface textures of its constituent yarns contribute to determining the pressure threshold of a crossover point and can be readily determined by experiment. Composite yarns of this type may be used to construct plain weave crossover points, without the float structures described above.

Figure 7:
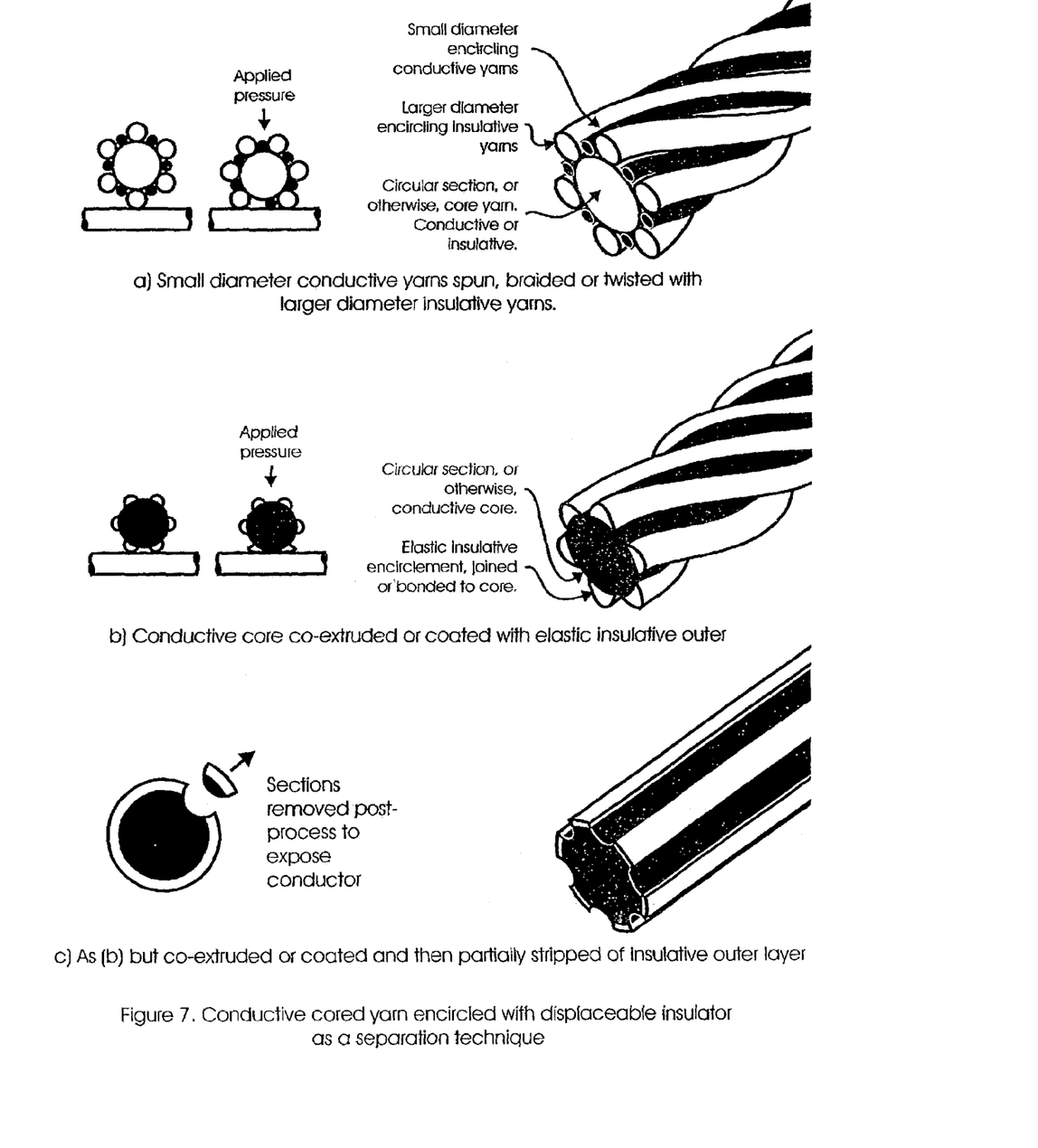
FIGS. 7*a* to 7*c* show various embodiments of conductive and insulating yarns.

Separation Technique—Conductive Cored Yarn Encircled with Displaceable Insulator Referring to FIGS. 7(a) to 7(c), there are shown various embodiments of yarn with both insulator and conductor. In FIG. 7(a) there is a core yarn substantially circular in cross-section which can be insulating or conductive as desired. Spun, braided or twisted around the core there are larger diameter insulating yarns and smaller diameter conductive yarns. As can be seen in the Figures, when no pressure is applied to the yarn, the conductive fibres remain spaced from the other conductor(s). However, upon application of a compressing force above the threshold, the insulating yarns are compressed and/or moved to allow contact of the conductive yarns on the conductive base (which may be another composite yarn of this type).

In FIG. 7(b) there is simply a conductive core having coated thereon or extruded therewith one or more insulating ribs, preferably in a helical arrangement. As can be seen, when no pressure is applied, the conductive core remains spaced from any conductive base upon which the composite is placed (the base may be the another composite structure such as this). However, upon application of a compressive force, there is compression of the insulating rib(s) to allow electrical contact.

In FIG. 7(c) a deformable conductive core has formed therewith an insulating sleeve from which sections are then removed to leave grooves with conductive troughs. Compression of the structure will cause deformation of the grooves such that a conductive substrate, which may for example be a plate or fibre-like conductor, will make electrical contact with the conductive core. It is not necessary for any part of the conductive core to be removed to create the groove, merely to enough insulator to be removed to allow access to the core.

Separation Technique—Self-Separating Sensory Composite Yarn

Figure 8:
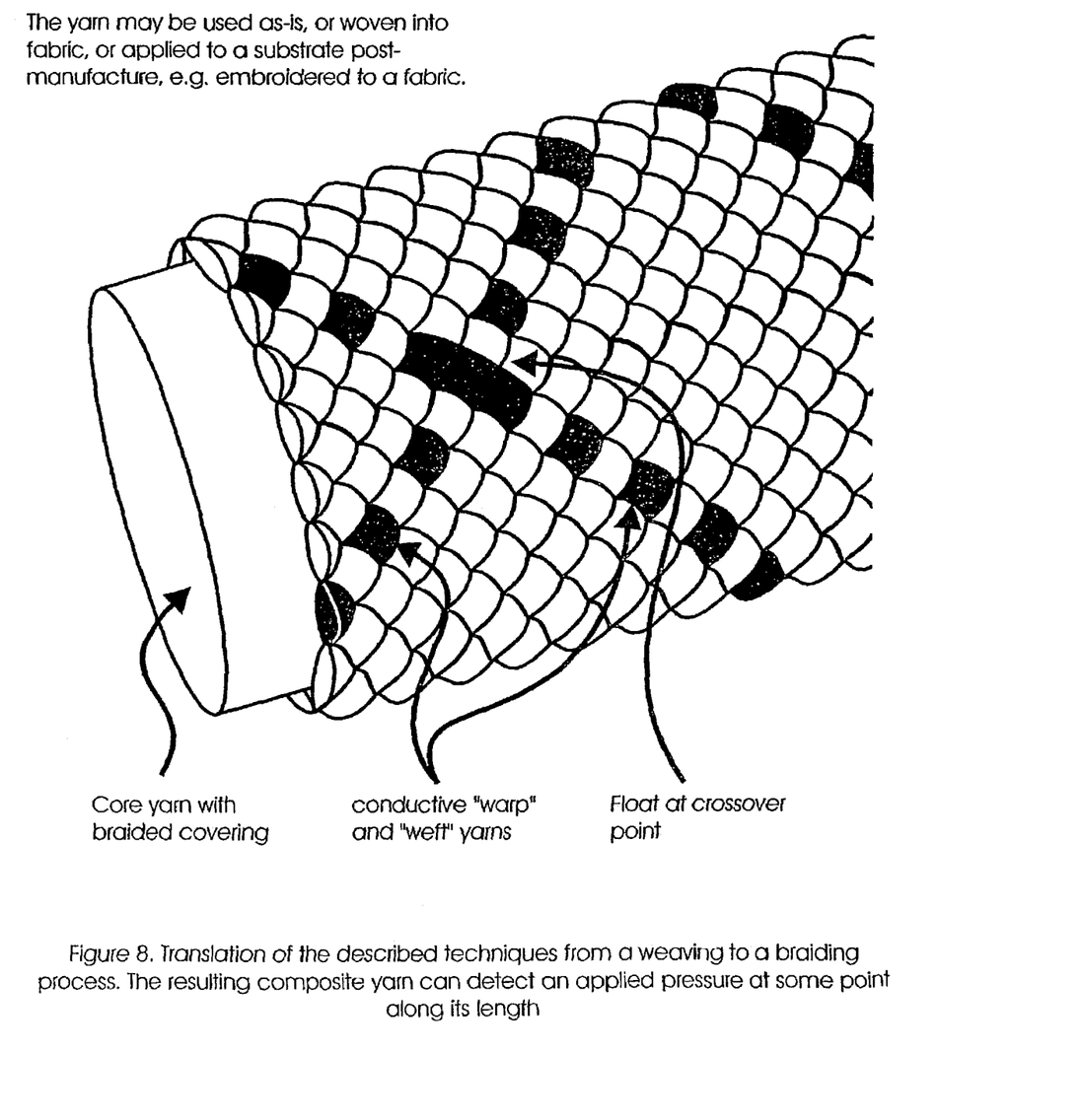
FIG. 8 shows another embodiment of composite yarn.

In FIG. 8 there is shown an embodiment of composite yarn having a core around which there is braided a conductive/insulating yarn with floating conductors, which enables the detection of pressure applied at a point along the length of the structure.

Parameters Controlling Actuation Pressure

A number of controllable manufacturing parameters determine the actuation pressure of a crossover point between two conductors in a woven piece of fabric.

a) Relative Diameters of Conductive and Insulating Yarns

As discussed above, if the conductive yarns in the weave are of a smaller diameter or cross-section than the insulating yarns, the conductive yarns at a crossover point are separated by a greater distance. The conductive yarns must be deflected further in order to make contact, thus requiring a greater actuation pressure.

b) Propensity of Conductive Yarn to Make Electrical Contact

A number of variables contribute to the propensity of a conductive yarn to make mechanical electrical contact. Conductive yarns with very smooth and/or hard surfaces tend to smaller areas of contact than fibrous and/or compressible yarns when contacted together under similar pressures. Mono-filament conductors of circular cross-section similarly offer less contact area than prism shaped or multi-filament yarns. Specifics of the composite yarns are described above.

c) Fabric Stiffness

The actuation pressure required to deflect the conductors at a crossover and make electrical contact is directly governed by the stiffness of the conductive and surrounding insulating yarns, and the general stiffness of the fabric, which in turn is governed by the weave structures used, the yarn spacing and the level of weft compacting, or beat, used. Stiffer fabric requires a greater force for a given deflection and will therefore result in crossovers of greater actuation pressure.

d) Number of Adjacent Conductive Yarns

Figure 9:
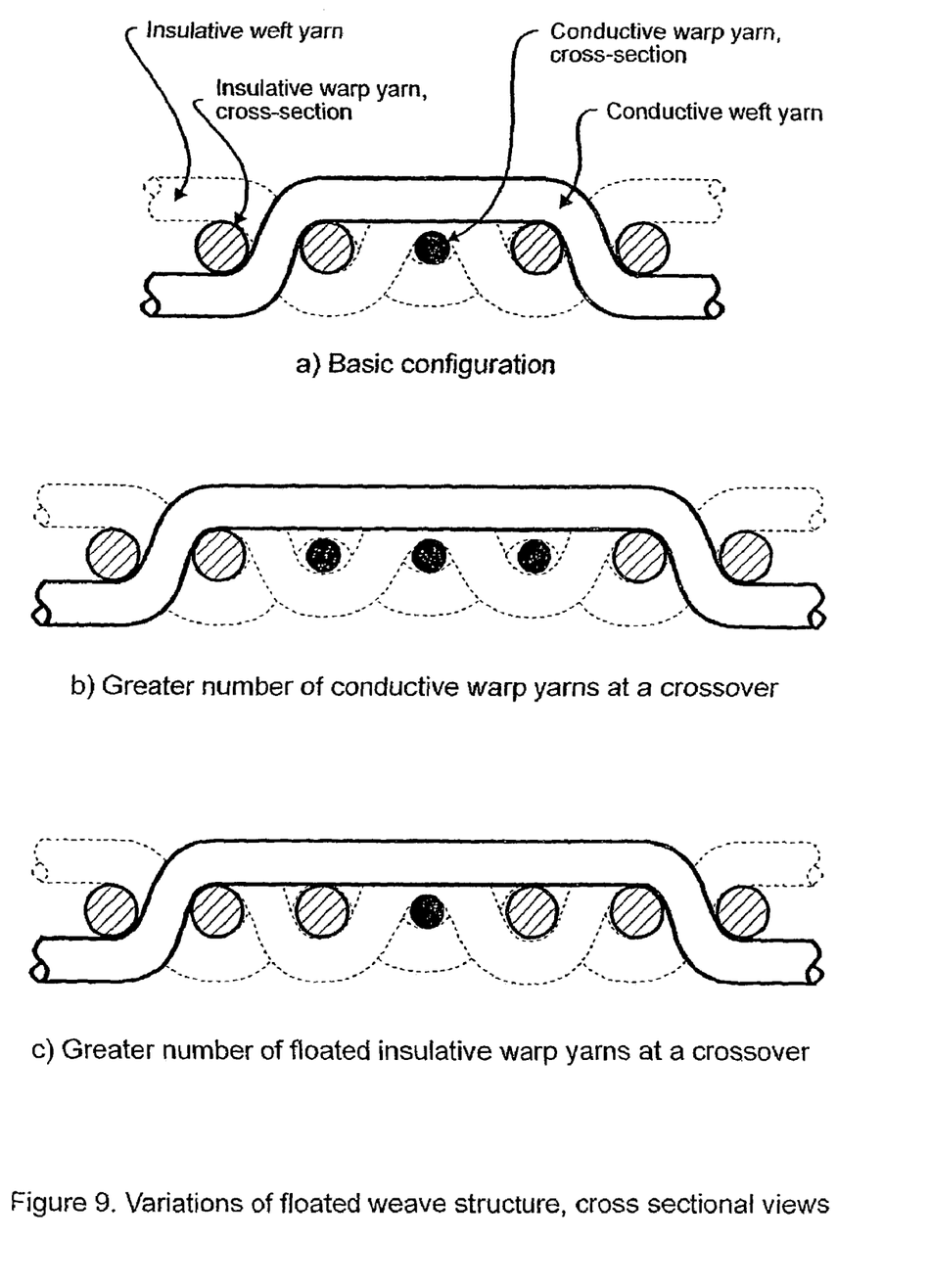
FIG. 9 shows variations of the embodiment of yarn with floating conductors.

If multiple adjacent conductive yarns are used instead of a single warp or weft conductive yarn, as in FIG. 9(a), the actuation pressure is reduced. Wider conductors with a greater number of adjacent yarns, as shown in FIG. 9(b), both offer a larger contact area at a crossover point and require less angular deflection of the yarns, and thus less pressure, to make contact.

e) Number of Yarns Floated

If a conductive weft yarn is floated over a minimum number of warp yarns to ensure separation at a crossover point, as shown in FIG. 9(a), the actuation pressure is correspondingly lesser than if the conductive weft is floated over a larger number of adjacent warp yarns, as shown in FIG. 9(c).

Implications to Note on Actuation Pressures

Controlling the aforementioned manufacturing parameters allows crossover points with predetermined actuation pressures to be woven into a piece of fabric. The threshold pressures for both electrical contact to be made and maximal contact to be achieved can be determined independently. Crossover points with different pressure thresholds may be incorporated into a single piece of fabric. This enables the construction of, for instance, a group of neighbouring crossover points that make contact consecutively with increasing pressure and together constitute a quantised pressure sensor.

Another implication of controlling the parameters at a crossover point is that the two conductive yarns may be woven to be in permanent electrical contact, regardless of applied pressure. Principally, this may be achieved through the use of a plain weave structure at the crossover point, where the conductive weft is not floated over any additional warps, but instead shares a large, permanent contact area with the conductive warp yarn. This allows, for instance, the woven construction of bus-bars, discussed herein.

Conversely, if the actuation pressure threshold of a crossover point is made very large, the two conductive yarns may be woven such that they never make electrical contact under typical operating conditions. This allows two conductors to pass over one another and remain electrically independent. This facility to design crossover points that make or fail to make contact within a grid of conductors allows the routing of current throughout the piece of fabric akin to the tracks of a printed circuit board.

Addressing the Matrix of Crossovers

Each crossover point between two conductors may be treated as an independent switch, with the array of crossovers constituting a row-column addressed matrix, similar to the majority of existing keyboards. In order to achieve this, each conductive yarn must be individually connected to a suitable circuit for scanning the matrix. Making this number of connections to the piece of fabric can prove inconvenient.

Figure 10:
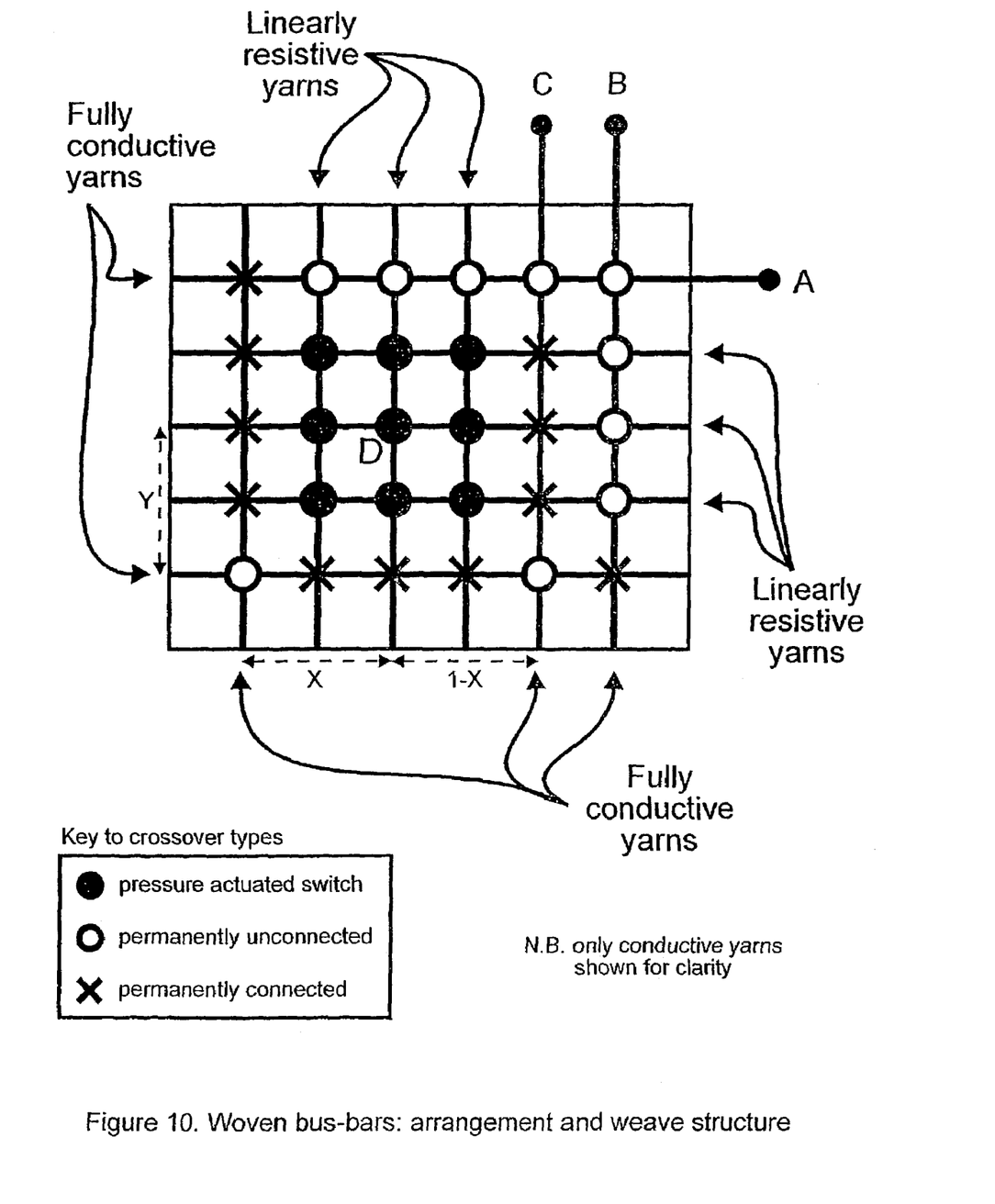
FIG. 10 is a schematic diagram of an embodiment of woven bus bars.
Figure 11:
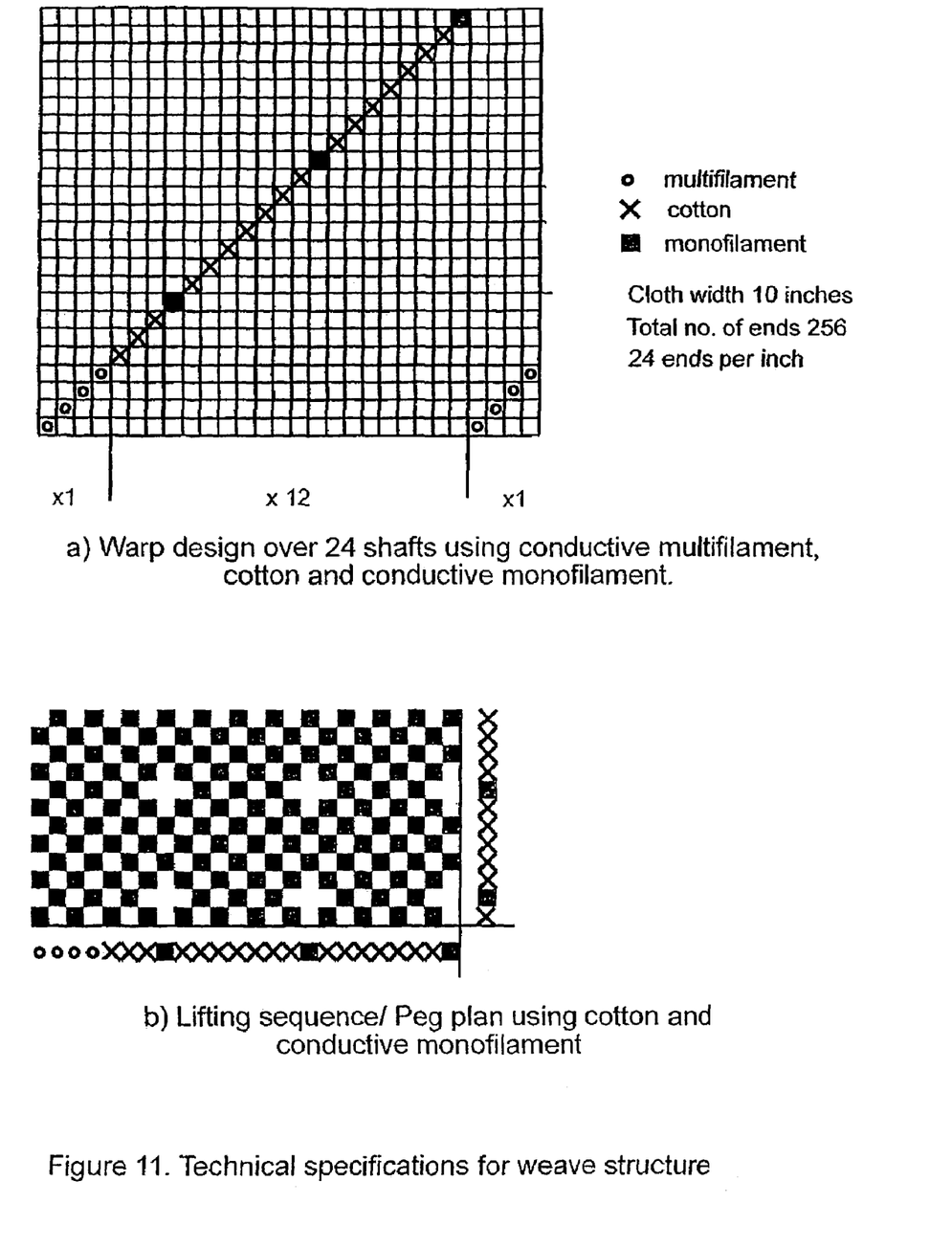
FIG. 11 shows an example of technical specification of weave structure.

Alternatively, a scheme which requires far fewer connections to the piece of fabric is to address the matrix of crossovers through electrical bus-bars, as shown in FIG. 10. These bus-bars each serve to interconnect the conductors of one set. The number of connections to the piece of fabric does not scale with the number of crossovers.

The bus-bars may be sewn, embroidered, printed, adhered, mechanically clamped or crimped to the piece of fabric in order to make electrical contact with the matrix of conductors. Most attractively, they can also be of woven construction, integral to the piece of fabric in a similar manner to the matrix. A typical arrangement is also shown in FIG. 10.

Some reproducible electrical characteristic, for example resistivity, can be measured to ascertain the length of a conductor and/or bus-bar. The position of a "closed switch" at a crossover in the matrix can be deduced from these measurements.

For example, first assume that the conductive yarns of the matrix exhibit a linear resistivity, and that connections are made to three perfectly conductive bus-bars as shown in FIG. 10. If the switch at crossover point D is closed, the resistance RAB measured from bus-bar A to bus-bar B is given by:

$$RAB=K(X+Y)$$

where K is a constant determined by the absolute lengths, cross-sectional areas and resistivities of the conductive yarns, and distances X and Y are the orthogonal vector components of point D, where $$0<=(X,Y)<=1.$$

Similarly, the resistance measured from bus-bar B to bus-bar C is given by:

$$RBC=K(Y+1-X).$$

Substituting gives:

$$X=[((RAB)/K)-((RBC)/K)+1]/2$$

and:

$$Y=[((RAB)/K)+((RBC)/K)-1]/2.$$

A Typical Example

This section details an example of weaving instructions for constructing a typical piece of fabric. A piece of fabric of arbitrary size may be reproduced from these specifications, although the repeat for a 250 mm width has been included. The crossover points are evenly spaced in a grid some 8.5 mm apart. Using the specified yarns and weave structures, the pressure threshold of the crossover points is roughly 80 kiloPascals, equivalent to 4 Newton force on a typical fingertip area of 50 square millimetres. The specifications also incorporate two bus-bars in the warp yarns, at either side of the piece of fabric.

The warp has been designed with two selvedge edges consisting of a twisted multi-filament yarn, BASF F901 G004, 8 warp threads at either edge of the warp on shafts 1-4, shown diagrammatically in FIG. 10(a).

The warp continues to use a 100% cotton 2/18's yarn set at 24 ends per inch. This is interspersed with conductive mono-filament type BASF F901 A013 every 8 warp threads on shafts 8, 16 and 24.

The lifting sequence/peg plan determines the order in which the shafts are moved to lift or leave the warp threads.

A weft thread of the same cotton is passed through the shed of lifted warp threads, as in the peg plan of FIG. 10(b) and substituted with the conductive mono-filament F901 A013 on every 6th pick. This determines the weft thread floats over the conductive warp threads.

Figure 12:
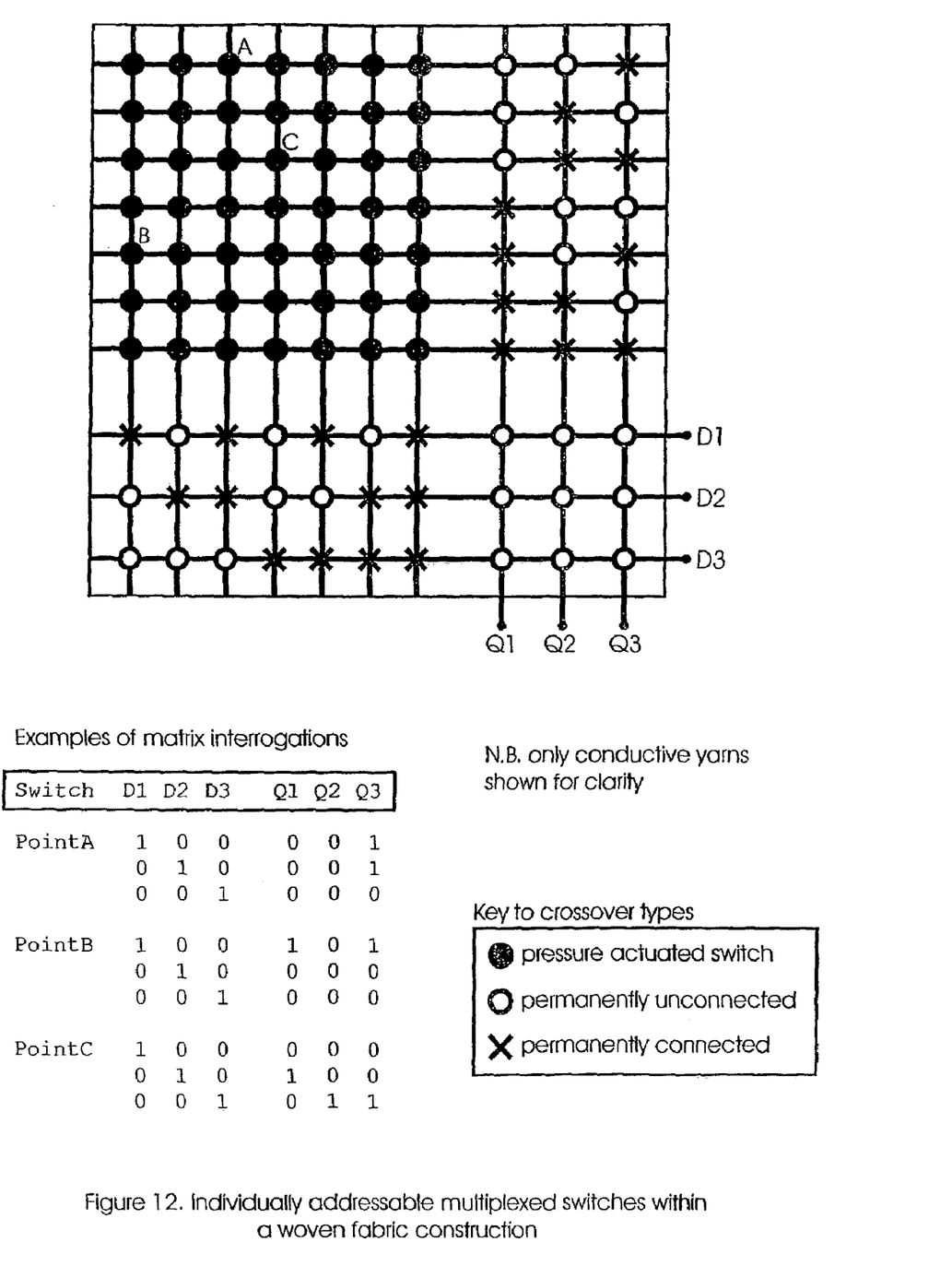
FIG. 12 shows an example of individually addressable multiplexed switches within a woven fabric construction.

Individually Addressable Multiplexed Switches within a Woven Fabric Construction FIG. 12 shows an embodiment of individually addressable multiplexed switches which can be formed form any of the embodiments described above. As can be seen, a grid of conductor crossover points are produced, by any of the above-described methods, and two bus bars provided with the permanent electrical connections as shown in the Figure. The switches provide, when closed, the closed circuits as shown in the example matrix configurations. More specifically, when each input line D* is connected to a positive potential in turn, the three resulting 3-bit patterns produced at the outputs Q1, Q2, Q3 uniquely identify a closed switch within the matrix of crossovers. Connecting the matrix to the inputs D1, D2 and D3 and outputs Q1, Q2 and Q3 according to a binary code allows more graceful response to multiple closed switches therein.

The invention claimed is:

1. A pressure sensor fabric provided with a single layer including warp and weft filaments within said single layer, wherein:
   a. the warp filaments include at least one first elongated electrical conductor and the weft filaments include at least one second elongated electrical conductor,
   b. the warp and weft filaments extend across and within a common plane within the layer, wherein the warp and weft fibers both include portions resting on opposite sides of the plane, said first conductor or conductors being crossed by said second conductor or conductors, said conductors being normally biased apart at a crossover point of said conductors with an air gap between them resulting from insulating fibers or filaments which bias the first and second conductors apart at the crossover point wherein application of pressure in a direction substantially normal to a plane of the fabric is required to cause the conductors to make direct conductive contact wherein the air gap between them is closed with the conductors touching, with such contact changing the conductive properties of the fabric and thereby allowing sensing of the pressure.

2. A fabric according to claim 1, including a plurality of spaced first conductors and/or a plurality of spaced second conductors, forming a plurality of said crossover points.

3. A fabric according to claim 1, wherein said biasing apart is effected locating an electrical conductor of relatively smaller cross-section between insulating filaments or fibers of relatively larger cross-section.

4. A fabric according to claim 1, wherein the weave includes warp and/or weft floats over more than one yarn to effect the biasing apart of first and second electrical conductors at the crossover point.

5. A fabric according to claim 1, wherein said biasing apart is effected by employing, as at least one of the electrical conductors, an electrical conductor including insulating filament or fiber wound around it to leave the surface of the conductor exposed at the crossover point.

6. A fabric according to claim 1, wherein said biasing apart is effected by twisting at least one of the electrical conductors together with insulating filament or fiber.

7. A fabric according to claim 1, wherein said biasing apart is effected by employing, as at least one of the electrical conductors, a fiber including an insulating yarn and a conductive yarn, the insulating yarn including portions extending beyond the conductive yarn.

8. A fabric according to claim 7, wherein there are provided two or more conductive yarns helically wound around the insulating yarn.

9. A fabric according to claim 1, wherein the electrical conductors have an electrical property which is proportional to the length of the conductor, whereby the length of a conductor or plurality of connecting conductors can be determined from measurement of that property.

10. A fabric according to claim 1, including at least one set of spaced electrical conductors, at least some of said set being electrically connected together to form at least one bus bar.

11. A fabric according to claim 10, wherein said set of spaced electrical conductors comprises electrically conductive filaments or fibers in the warp or weft of a woven construction and electrical connection between conductors of that set is provided by one or more electrically conducting filaments or fibers in the well or warp, respectively.

12. A fabric according to claim 10, wherein said set of spaced electrical conductors comprises electrically conductive filaments or fibers in the warp or weft of a woven construction and said electrical connection is made after the weaving process.

13. A pressure sensor fabric comprising a sheet which includes therein:
   a. an elongated first conductor, and
   b. an elongated second conductor crossing the first conductor,
   c. an insulator maintaining the first and second conductors in spaced relation with an air gap therebetween at the location within the fabric at which the first and second conductors cross, the insulator running alongside at least one of the first and second conductors over a major portion of its length, wherein:
   (1) the first conductor, second conductor, and insulator are all present within a single layer of the fabric, wherein the first conductor, second conductor, and insulator all extend across and within a common plane, with the first conductor, second conductor, and insulator all having portions resting on opposite sides of the plane;
   (2) applying pressure to a portion of the plane of the fabric is required to displace the insulator and move the first and second conductors into conductive contact with the first and second conductors touching each other, thereby changing the electrical properties of the fabric and providing a sensor signal indicative of the pressure.

14. The fabric of claim 13 wherein the diameter of the insulator is greater than the diameter of at least one of the conductors.

15. A sheet of pressure sensor fabric comprising:
   a. several elongated first conductors oriented in at least substantially parallel relationship, and
   b. several elongated second conductors oriented in at least substantially parallel relationship, the second conductors crossing the first conductors,
   c. several elongated insulators, each
      i) extending alongside at least one of the first and second conductors over a major portion of its length and
      ii) maintaining the first and second conductors in spaced relation with an air gap therebetween at the locations at which the first and second conductors cross wherein:
   (1) the first conductors, second conductors, and insulators are all present within a single layer of the fabric, wherein the first conductors, second conductors, and insulators all extend about a common plane, with the first conductors, second conductors, and insulators all having portions extending between opposite sides of the plane, and
   (2) applying pressure to a portion of the plane of the fabric is required to move the first and second conductors into direct conductive contact with the first conductor touching the second conductor, thereby altering the conduction of the fabric to allow sensing of the pressure.

16. The sheet of claim 15 wherein each insulator extends alongside and in contact with at least one of the first and second conductors over a major portion of its length.

17. A fabric according to claim 1 wherein the first conductor, second conductor, and insulating fibers are interwoven within the common plane.

18. A fabric according to claim 1 wherein the first conductor weaves above and below a plane wherein the second conductor is situated.

19. A fabric according to claim 1 wherein sections of both the first conductor and the second conductor are exposed on both of the opposite sides of the layer.

20. The fabric of claim 13 wherein the first conductor, second conductor, and insulator are interwoven within the common plane.

21. The fabric of claim 13 wherein the first conductor weaves above and below a plane wherein the second conductor is situated.

22. A fabric according to claim 13 wherein sections of both the first conductor and the second conductor face outwardly from both of the opposite sides of the layer.

23. The sheet of claim 15 wherein the first conductors, second conductors, and insulators are interwoven within the common plane.

24. The sheet of claim 15 wherein the first conductors weave above and below a plane wherein the second conductors are situated.

25. The sheet of claim 15 wherein sections of both the first conductors and the second conductors are situated at outermost portions of both of the opposite sides of the layer.

* * * * *